United States Patent
Goto

(10) Patent No.: US 12,167,235 B2
(45) Date of Patent: Dec. 10, 2024

(54) COMMUNICATION APPARATUS, CONTROL METHOD OF COMMUNICATION APPARATUS AND NON-TRANSITORY COMPUTER-READABLE STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 17/328,915

(22) Filed: May 24, 2021

(65) Prior Publication Data

US 2021/0282008 A1    Sep. 9, 2021

Related U.S. Application Data

(63) Continuation of application No. PCT/JP2019/042483, filed on Oct. 30, 2019.

(30) Foreign Application Priority Data

Nov. 29, 2018 (JP) ................................. 2018-223974

(51) Int. Cl.
| | |
|---|---|
| *H04W 12/047* | (2021.01) |
| *H04W 4/029* | (2018.01) |
| *H04W 12/06* | (2021.01) |
| *H04W 76/10* | (2018.01) |
| *H04W 84/12* | (2009.01) |

(52) U.S. Cl.
CPC ......... *H04W 12/047* (2021.01); *H04W 4/029* (2018.02); *H04W 12/06* (2013.01); *H04W 76/10* (2018.02); *H04W 84/12* (2013.01)

(58) Field of Classification Search
CPC ... H04W 12/04; H04W 12/047; H04W 12/06; H04W 12/50; H04W 4/029; H04W 76/10; H04W 84/12
See application file for complete search history.

(56) References Cited

U.S. PATENT DOCUMENTS

| | | | | |
|---|---|---|---|---|
| 11,200,012 | B2* | 12/2021 | Tsuji | ................... G06F 3/1222 |
| 2004/0240412 | A1* | 12/2004 | Winget | ............... H04W 12/062 |
| | | | | 455/436 |
| 2005/0032506 | A1* | 2/2005 | Walker | .................. H04L 9/0844 |
| | | | | 455/410 |
| 2006/0191000 | A1* | 8/2006 | O'Hara, Jr. | ....... H04W 12/0431 |
| | | | | 380/278 |

(Continued)

FOREIGN PATENT DOCUMENTS

| | | |
|---|---|---|
| JP | 2010-093585 A | 4/2010 |
| JP | 2017-130971 A | 7/2017 |

*Primary Examiner* — Matthew C Sams

(74) *Attorney, Agent, or Firm* — Canon U.S.A., Inc., IP Division

(57) ABSTRACT

A communication apparatus obtains an encryption key by executing network introduction processing with another communication apparatus using a communication parameter obtained in accordance with DPP standard, executes connection processing with the other communication apparatus using the encryption key, and omits obtaining the encryption key by the network introduction processing in a re-connection with the other communication apparatus.

22 Claims, 6 Drawing Sheets

(56) References Cited

U.S. PATENT DOCUMENTS

| | | | |
|---|---|---|---|
| 2007/0280169 A1* | 12/2007 | Cam Winget | H04W 36/0088 |
| | | | 370/331 |
| 2013/0090115 A1* | 4/2013 | Deivasigamani | H04W 48/20 |
| | | | 455/434 |
| 2013/0247150 A1* | 9/2013 | Cherian | H04W 12/06 |
| | | | 726/4 |
| 2017/0295448 A1 | 10/2017 | McCann | |
| 2018/0109381 A1 | 4/2018 | Cammarota | |
| 2018/0109418 A1 | 4/2018 | Cammarota | |
| 2018/0278625 A1 | 9/2018 | Cammarota | |
| 2019/0303071 A1* | 10/2019 | Tsuji | H04W 76/15 |
| 2019/0306919 A1* | 10/2019 | Miyake | H04W 12/55 |
| 2019/0332774 A1* | 10/2019 | Nix | H04W 12/50 |
| 2020/0099539 A1* | 3/2020 | Bernsen | H04L 63/18 |
| 2023/0262454 A1* | 8/2023 | Kamath | H04W 12/04 |
| | | | 726/7 |

* cited by examiner

COMMUNICATION APPARATUS, CONTROL METHOD OF COMMUNICATION APPARATUS AND NON-TRANSITORY COMPUTER-READABLE STORAGE MEDIUM

CROSS-REFERENCE TO RELATED APPLICATIONS

This application is a Continuation of International Patent Application No. PCT/JP2019/042483, filed Oct. 30, 2019, which claims the benefit of Japanese Patent Application No. 2018-223974, filed Nov. 29, 2018, both of which are hereby incorporated by reference herein in their entireties.

BACKGROUND OF THE INVENTION

Field of the Invention

The present invention relates to a communication technique.

Background Art

In recent years, cases are increasing where a wireless communication function is incorporated in electronic devices such as a digital camera, a printer, and a mobile phone/smartphone, and these devices are used while being connected to a wireless network.

In order to connect an electronic device to a wireless network, various communication parameters such as an encryption method, an encryption key, an authentication method, and an authentication key need to be set. A setting protocol (Wi-Fi Device Provisioning Protocol, hereinafter referred to as "DPP") for communication parameters using a QR code (registered trademark) or the like is formulated as a technique for facilitating setting of these communication parameters (PTL 1).

In the DPP described in PTL 1, a configurator that provides communication parameters provides information needed for establishing connection to an access point, to an enrollee that receives the communication parameters. The enrollee device is a station (STA) or an access point (AP) specified in the IEEE 802.11 standard. In order to establish connection between the STA and the AP after the communication parameters have been provided by the configurator, authentication processing and confirmation of an encryption key need to be performed between the STA and the AP.

CITATION LIST

Patent Literature

PTL 1: US-2017-0295448

Even between enrollees regarding which the communication parameter setting using the DPP has been completed (between enrollees that have been authenticated and regarding which the encryption key has been confirmed), confirmation of the encryption key and the authentication processing need to be performed every time the connection is re-established (re-connection). As a result, the processing in the re-connection becomes redundant, and it takes time to re-establish the connection.

SUMMARY OF THE INVENTION

The present invention aims to provide a technique for simplifying the processing between communication apparatuses that is needed to re-establish connection.

According to one aspect of the present invention, there is provided a communication apparatus, comprising: a first obtaining unit configured to obtain a communication parameter in accordance with a Wi-Fi DPP (Device Provisioning Protocol) standard; a second obtaining unit configured to obtain an encryption key by executing network introduction processing conforming to DPP with a first other communication apparatus using the communication parameter obtained by the first obtaining unit; a connection unit configured to execute connection processing with the first other communication apparatus using the encryption key obtained by executing the network introduction processing; and a re-connection unit configured to establish connection with the first other communication apparatus while omitting obtaining the encryption key by the network introduction processing, in a re-connection with the first other communication apparatus.

According to another aspect of the present invention, there is provided a communication apparatus, comprising: an obtaining unit configured to obtain an encryption key by executing network introduction processing conforming to DPP with another communication apparatus; a connection unit configured to establish connection with the other communication apparatus using the encryption key obtained by executing the network introduction processing; and a re-connection unit configured to establish, if a request signal to which information for specifying the encryption key is added has been received from the other communication apparatus, connection with the other communication apparatus while omitting the network introduction processing.

According to another aspect of the present invention, there is provided a control method of a communication apparatus, comprising: obtaining a communication parameter in accordance with a Wi-Fi DPP (Device Provisioning Protocol) standard; obtaining an encryption key by executing network introduction processing conforming to DPP with a first other communication apparatus using the communication parameter obtained; executing connection processing with the first other communication apparatus using the encryption key obtained by executing the network introduction processing; and establishing connection with the first other communication apparatus while omitting obtaining the encryption key by the network introduction processing, in a re-connection with the first other communication apparatus.

According to another aspect of the present invention, there is provided a control method of a communication apparatus, comprising: obtaining an encryption key by executing network introduction processing conforming to DPP with another communication apparatus; establishing connection with the other communication apparatus using the encryption key obtained by executing the network introduction processing; and establishing, if a request signal to which information for specifying the encryption key is added has been received from the other communication apparatus, connection with the other communication apparatus while omitting the network introduction processing.

According to another aspect of the present invention, there is provided a non-transitory computer-readable storage medium storing a program for causing a computer to execute a control method of a communication apparatus, the control method comprising: obtaining a communication parameter in accordance with a Wi-Fi DPP (Device Provisioning Protocol) standard; obtaining an encryption key by executing network introduction processing conforming to DPP with a first other communication apparatus using the communication parameter obtained; executing connection processing with the first other communication apparatus using the encryption key obtained by executing the network introduction processing; and establishing connection with the first other communication apparatus while omitting obtaining the encryption key by the network introduction processing, in a re-connection with the first other communication apparatus.

According to another aspect of the present invention, there is provided a non-transitory computer-readable storage medium storing a program for causing a computer to execute a control method of a communication apparatus, the control method comprising: obtaining an encryption key by executing network introduction processing conforming to DPP with another communication apparatus: establishing connection with the other communication apparatus using the encryption key obtained by executing the network introduction processing; and establishing, if a request signal to which information for specifying the encryption key is added has been received from the other communication apparatus, connection with the other communication apparatus while omitting the network introduction processing.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, a communication apparatus according to the present embodiment will be described in detail with reference to the drawings. In the following, an example will be described in which a wireless LAN system conforming to the IEEE (The Institute of Electrical and Electronics Engineers, Inc) 802.11 series standard is used. However, the communication mode is not necessarily limited to the wireless LAN conforming to IEEE 802.11.

Figure 3:
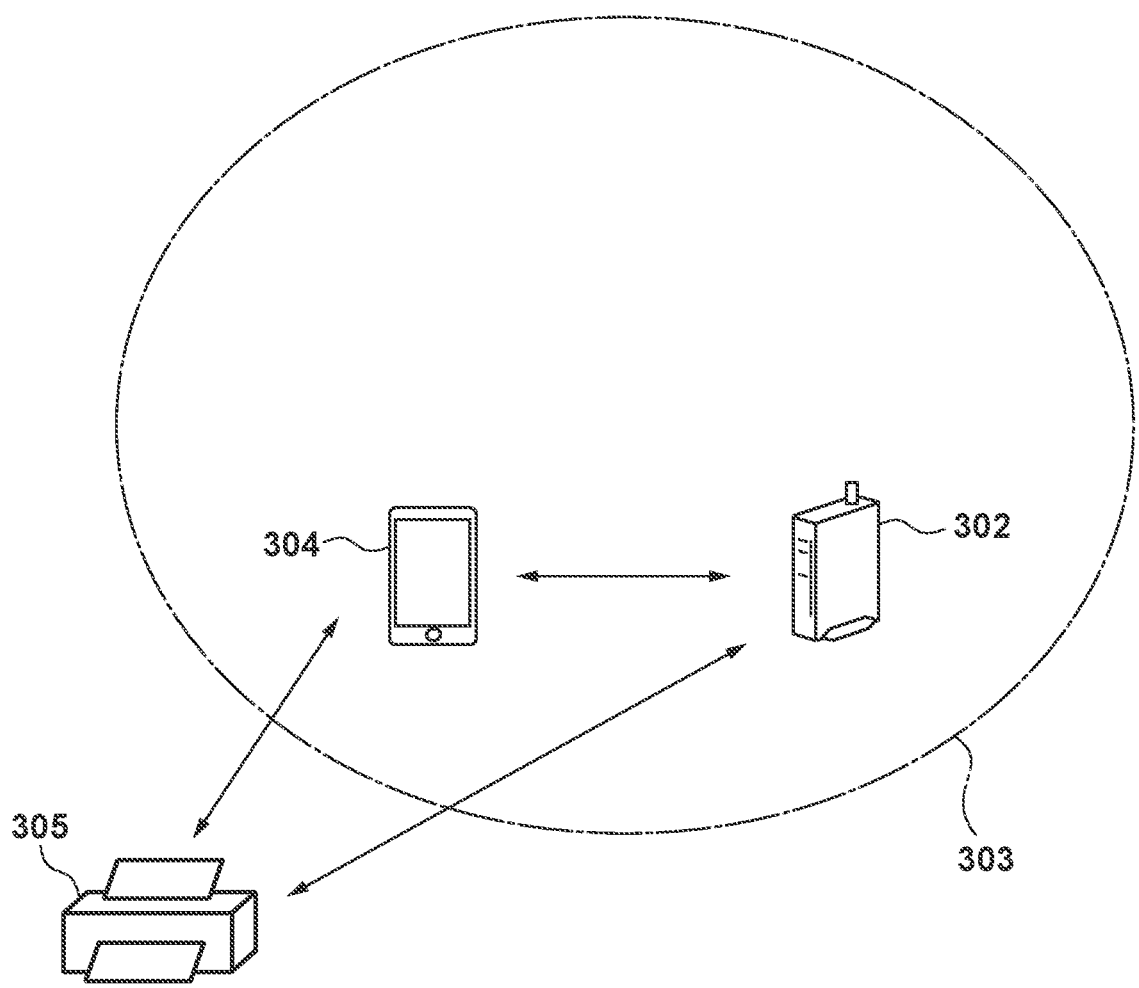
FIG. 3 is a diagram illustrating an example of the configuration of a communication system.

FIG. 3 is a diagram illustrating an exemplary configuration of a communication system according to the present embodiment. The communication system includes an access point 302, a smartphone 304, a printer 305, and a wireless LAN network (hereinafter, wireless network 303). In the following, processing for causing the printer 305 to participate in the wireless network 303 formed by the access point 302 will be described. The smartphone 304 functions as a configurator specified in the DPP (Device Provisioning Protocol), and provides information for establishing connection to the access point 302, to the printer 305.

Note that a description will be given assuming that the apparatuses in the communication system in the present embodiment are a smartphone, an access point, and a printer, but the apparatuses may also be other apparatuses such as a mobile phone, a camera, a PC, a video camera, a smart watch, and a PDA. Also, a description will be given assuming that the number of apparatuses in the communication system is three, but the number may also be two or four or more.

Figure 1:
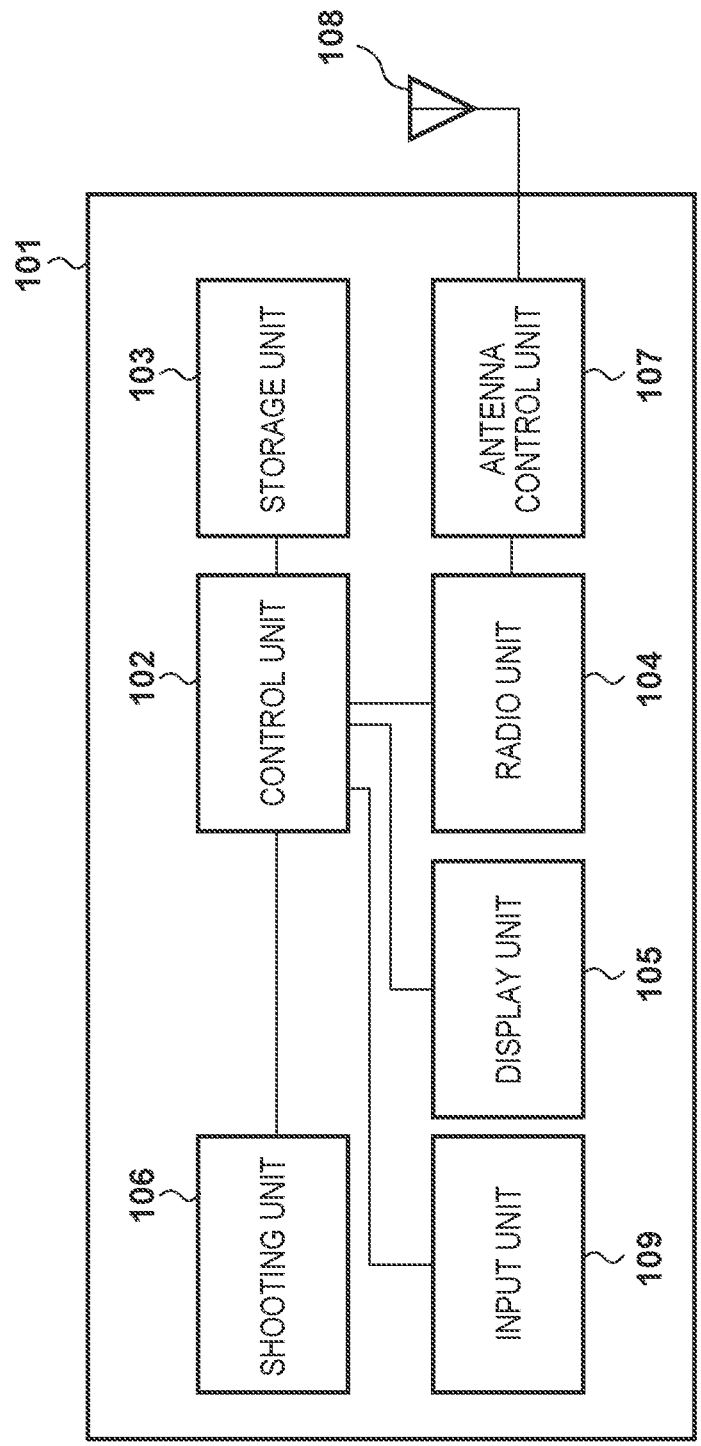
FIG. 1 is a diagram illustrating an exemplary hardware configuration of a communication apparatus.

Next, the hardware configuration, in the present embodiment, of the communication apparatuses (access point 302, smartphone 304, and printer 305) of the communication system shown in FIG. 3 will be described using FIG. 1. In FIG. 1, 101 indicates the entirety of the apparatuses. 102 indicates a control unit that performs overall control on the apparatuses by executing a control program stored in a storage unit 103. The control unit 102 is constituted by a CPU (Central Processing Unit), for example. 103 indicates the storage unit that stores a control program to be executed by the control unit 102, image data, and various types of information such as communication parameters. Various operations that will be described later are performed by the control unit 102 executing a control program stored in the storage unit 103. The storage unit 103 is constituted by a ROM, a RAM, an HDD, a flash memory, and/or a storage medium such as a detachable SD card, for example.

104 indicates a radio unit for performing wireless LAN communication conforming to the IEEE 802.11 series. The radio unit 104 is constituted by a chip for performing wireless communication. 105 indicates a display unit that performs various displays, and has functions for enabling an output of visually recognizable information such as an LCD or an LED, or a sound output such as a speaker. The display unit 105 has a function of outputting at least one of visual information and sound information. The display unit 105 includes, if displaying visual information, a VRAM (Video RAM) for retaining image data corresponding to visual information to be displayed. The display unit 105 performs display control such that an LCD or an LED is caused to continuously display image data stored in the VRAM.

106 indicates a shooting unit that is constituted by an image sensor, lenses, and the like, and performs shooting of a photograph or a moving image. The shooting unit 106 performs shooting of images such as a one-dimensional bar code and a two-dimensional code such as a QR code (registered trademark). 107 indicates an antenna control unit that performs output control of an antenna 108, and 108 indicates the antenna for enabling communication in a 2.4 GHz band and/or a 5 GHz band, for performing communication in the wireless LAN. 109 indicates an input unit for allowing a user to operate the communication apparatus 101 by performing various inputs or the like. The input unit 109 stores a flag corresponding to the input in a memory such as the storage unit 103. Note that the example in FIG. 1 is merely an example, and the communication apparatus may include other hardware constituent elements. For example, when the communication apparatus 101 is a printer, a printing unit may also be included in addition to the constituent elements shown in FIG. 1. Also, when the communication apparatus 101 is an access point 302, the shooting unit 106 and the display unit 105 need not be included.

Figure 2:
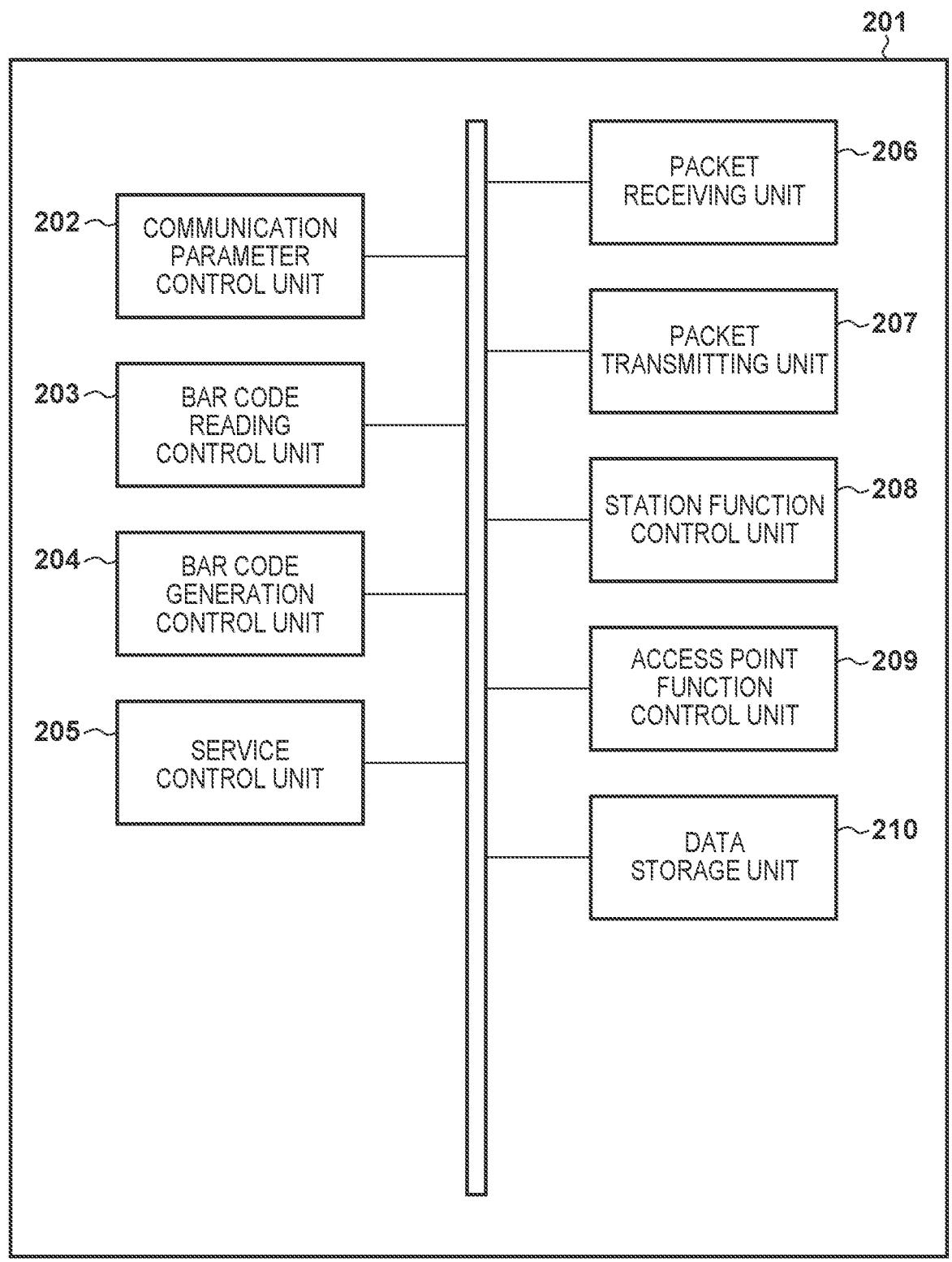
FIG. 2 is a diagram illustrating an exemplary software functional configuration of a communication apparatus.

FIG. 2 is a block diagram illustrating an example of the configuration of software functional blocks that execute a later-described communication control function. In the present embodiment, each functional block of the communication apparatus 101 is stored in the storage unit 103 as a control program, and the function thereof is implemented by the control unit 102 executing the control program. The control unit 102 realizes the functional blocks by controlling the pieces of hardware and performing computation and processing of information in accordance with the control programs. Note that some of or all of the functional blocks may be realized by hardware. In this case, some of or all of the functional blocks are constituted by an ASIC (Application Specific Integrated Circuit), for example.

In FIG. 2, 201 indicates the entirety of software functional blocks. 202 indicates a communication parameter control unit. The communication parameter control unit 202 executes communication parameter sharing processing for sharing the communication parameters between apparatuses. In the communication parameter sharing processing, a providing apparatus provides communication parameters for performing wireless communication to a receiving apparatus. Here, the communication parameters include wireless communication parameters needed for performing wireless LAN communication such as an SSID (Service Set Identifier) serving as a network identifier, an encryption method, an encryption key, an authentication method, and an authentication key. Also, a connector specified in the DPP, a MAC address, PSK, a passphrase, an IP address for performing communication through an IP layer, information needed for an upper-level service, and the like may be included in the communication parameters. The communication parameter sharing processing to be executed by the communication parameter control unit 202 is assumed to be the DPP. However, the communication parameter sharing processing to be executed by the communication parameter control unit 202 is not limited to the DPP, and may be other processing such as WPS (Wi-Fi Protected Setup) or Wi-Fi Direct.

203 indicates a bar code reading control unit. The bar code reading control unit 203 obtains encoded information by analyzing an image of a one-dimensional bar code, a two-dimensional code such as a QR code (registered trademark), or the like that is shot by the shooting unit 106. The bar code reading control unit 203 shoots, using the shooting unit 106, code information including a public key to be used when the communication parameter sharing processing is executed, and obtains the shot image. Note that the code information may be a two-dimensional code such as a CP code or a QR code (registered trademark) or a one-dimensional code such as a bar code. The bar code reading control unit 203 obtains encoded information by analyzing an image of code information obtained by shooting performed by the shooting unit 106. In the present embodiment, information to be used in the communication parameter sharing processing may be included in the code information. The information to be used in the communication parameter sharing processing is information such as a public key and an apparatus identifier that are used in authentication processing. Note that the public key is information to be used to improve the security when the communication parameter sharing processing is performed, and may be information such as a certificate or a password. Here, the public key is one type of encryption key to be used in a public key cryptosystem.

204 indicates a bar code generation control unit that performs control so as to generate a one-dimensional bar code, or a two-dimensional code such as a QR code (registered trademark) and display the generated code in the display unit 105. The bar code generation control unit 204 generates code information including pieces of information such as a public key and an identifier of the communication apparatus that are used when the communication parameter sharing processing is executed. 205 indicates a service control unit in an application layer. The application layer here indicates a service providing layer in an upper layer of layer 5 or more in an OSI reference model. For example, the service control unit 205 executes printing processing, image streaming processing, file transfer processing, or the like using wireless communication performed by the radio unit 104.

206 indicates a packet receiving unit and 207 indicates a packet transmitting unit, and these units control transmission and reception of any packets including a communication protocol with an upper layer. Also, the packet receiving unit 206 and the packet transmitting unit 207 control the radio unit 104 in order to perform transmission and reception of packets to and from an opposing apparatus in conformity to the IEEE 802.11 standard.

208 indicates a station function control unit that provides an STA function so as to operate as a station (STA) in an infrastructure mode specified in the IEEE 802.11 standard. The station function control unit 208 performs authentication/encryption processing and the like when functioning as an STA. Also, 209 indicates an access point function control unit that provides an AP function for functioning as an access point (AP) in the infrastructure mode specified in the IEEE 802.11 standard. The AP function control unit 209 forms a wireless network, and performs authentication/encryption processing and the like regarding an STA and management and the like of the STA. 210 indicates a data storage unit that performs control regarding writing and reading of software itself and information such as communication parameters and a bar code to and from the storage unit 103. Note that when the communication apparatus 101 is the access point 302, the bar code reading control unit 203 and the station function control unit 208 need not exist.

The operations of the communication system configured as described above will be described. The access point 302 constructs the wireless network 303, and the smartphone 304 retains communication parameters with which connection to the access point 302 is possible. An existing protocol such as WPS or AOSS may be used as an obtaining method of communication parameters, in the smartphone 304, if the access point 302 is not compatible with the DPP. An automatic setting using the DPP or the like may be used, if the access point 302 is compatible with the DPP. Also, a user may manually input the communication parameters using the input unit 109.

Figure 4:
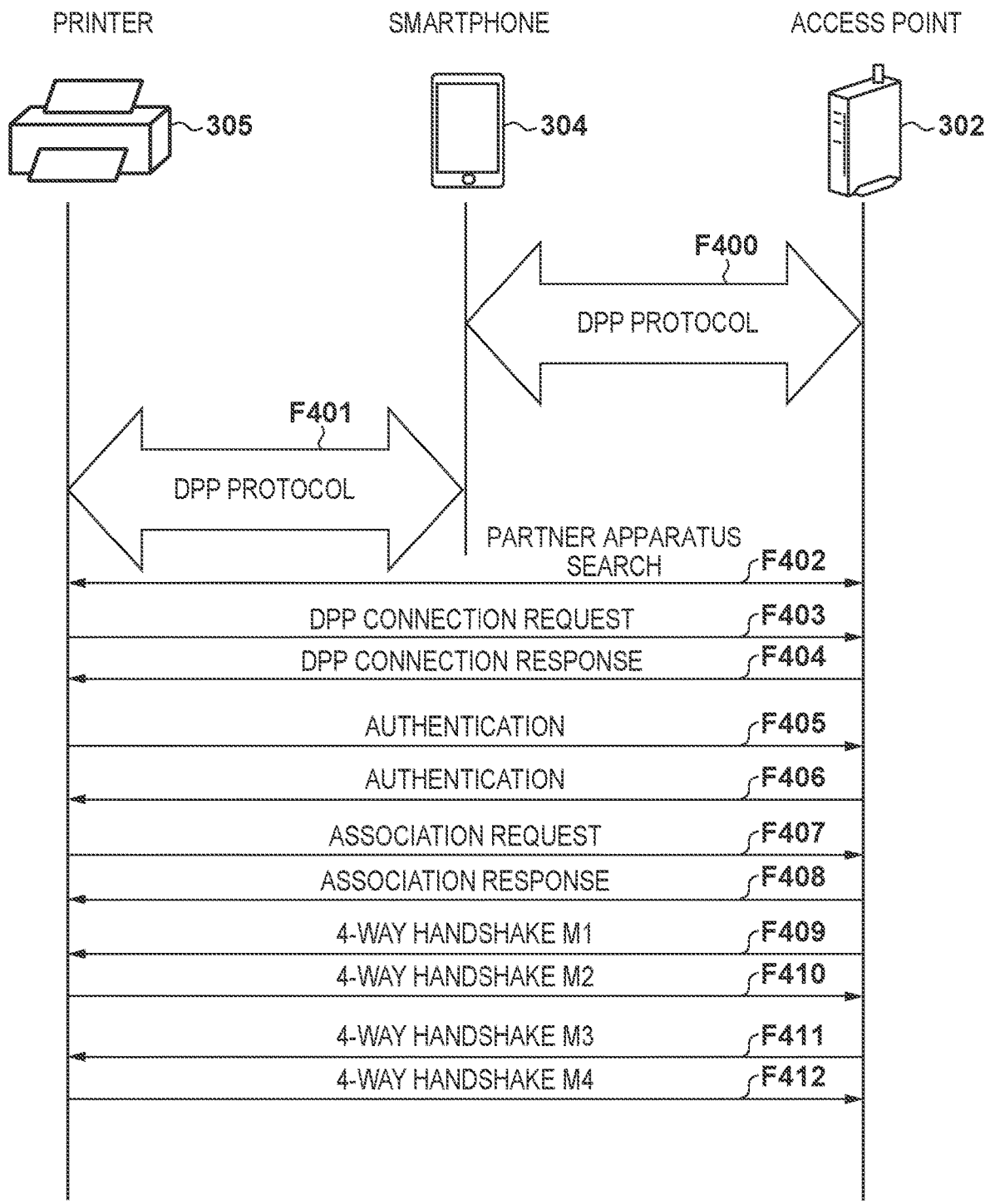
FIG. 4 is a diagram illustrating an operation sequence between communication apparatuses.

FIG. 4 is a diagram illustrating an example of an operation sequence between communication apparatuses of the present embodiment. The operation sequence to be performed between communication apparatuses (processing operation sequence performed between access point 302, smartphone 304, and printer 305) according to the present embodiment will be described using FIG. 4. The operation sequence of the printer 305 shown in FIG. 4 is broadly divided into next three processing operations. First processing is processing (F400, F401) in which the printer 305 obtains information regarding the communication parameters of the wireless network from another communication apparatus (smartphone 304), and sets the communication parameters. In this example, the information regarding processing of setting communication parameters is obtained by the DPP, and the communication parameters are obtained and set. Second processing is processing (F403 to F404) in which communication parameters for communication via the wireless network are shared between the printer 305 and the access point 302 based on the obtained communication parameters, and the encryption key is set based on the shared communication parameter. The processing for sharing communication parameters is executed based on information regarding the processing of setting communication parameters, and includes the procedure of network introduction specified in the DPP, for example. Third processing is processing (F405 to F412) of establishing communication with the wireless network between the access point 302 and the printer 305 based on the shared communication parameters and the set encryption key. The third processing includes 4-way handshake, for example. In the following, the processing shown in FIG. 4 will be described in more detail.

The manner of establishing the network while using the access point 302 and the printer 305 as enrollee devices, and the smartphone 304 as a configurator device, is shown in FIG. 4. In the setting of communication parameters in the DPP, because all devices in the network are managed by the configurator, first, the information regarding processing of setting communication parameters of the access point 302 is obtained using the smartphone 304 (F400). Thereafter, the information regarding processing of setting communication parameters of the printer 305 is obtained and the communication parameters are set using the smartphone 304 (F401). The information regarding communication parameters is information included in the DPP credential, for example, and the details thereof are as defined in the DPP specification.

With the procedure described above, obtaining the information regarding processing of setting communication parameters in the two enrollee devices, namely the printer 305 and the access point 302, and setting of the communication parameters are completed. Then, the procedure for connecting the printer 305 to the network constructed by the access point 302 is started. First, sharing of the communication parameters and the setting of the encryption key (PMK) are executed between the printer 305 and the access point 302. Specifically, the printer 305 transmits a connection request signal (DPP connection request) conforming to the DPP to the access point 302 (F403). That is, the printer 305 transmits a peer discovery request to the access point, and the sequence of network introduction specified by the DPP is started.

Note that, at a point in time before transmitting the connection request signal, the printer 305 has not specified the access point 302 to which connection is to be established. Therefore, the printer 305 performs a partner apparatus search specified by the IEEE 802.11 standard (F402) before transmitting the connection request signal. Here, the partner apparatus search specified by the IEEE 802.11 standard includes:

a method of receiving a beacon signal (beacon) transmitted from the access point 302 and specifying the access point using an SSID or the like (passive scan), a method of the printer 305 transmitting a Probe Req signal (probe request), and specifying the access point by receiving a Probe Resp signal (probe response) that is the response thereto (active scan), and the like. Note that, other than the passive scan and the active scan, a configuration may be adopted in which the connection request signal is transmitted to all the devices on the network as a broadcast packet.

The access point 302 that has received the DPP connection request from the printer 305 (F403) transmits a DPP connection response to the printer 305 as a response (F404). In the transmission and reception of the DPP connection request and the DPP connection response in F403 and F404, following three confirmation procedures (1) to (3) are performed based on the information transferred from the configurator device to each enrollee device. As a result of these confirmation procedures, the printer 305 and the access point 302 can each determine that the connection therebetween is possible. Note that the following confirmation contents are specified in the network introduction exchange in the DPP.

(1) Confirmation of whether or not each enrollee device has received communication parameters from the same configurator device, (2) Confirmation of the combination of roles of devices regarding which connection is to be established being a combination of AP-STA, and not a combination of the same role such as STA-STA or AP-AP, (3) Confirmation of whether or not each enrollee device is expected to form a same group by the configurator device.

Also, the access point 302 and the printer 305 calculates a PMK (pairwise master key) while performing the DPP connection request/response in F403 and F404. The calculation of the PMK is realized by PMKSA information being established between the printer 305 and the access point 302 based on the communication parameters conforming to the DPP specification that are set to the access point 302 and the printer 305 from the smartphone 304, for example. Moreover, a hash value called a PMKID (PMK Identifier) is calculated by a method specified in the IEEE 802.11 standard based on the calculated PMK.

The communication parameters for performing wireless communication via the wireless network are shared between the printer 305 and the access point 302 with the DPP connection request and the DPP connection response, and the encryption key (PMK) is set. Thereafter, when the connection processing is performed, transmission and reception of an authentication packet (F405, F406) is performed, as specified in the IEEE 802.11 standard, for example. Then, transmission and reception of an association request packet and an association response packet (F407, F408) is performed. Thereafter, 4-Way handshake is performed (F409 to F412) for generating an actual session key (PTK (pairwise transient key) according to the IEEE 802.11 standard) based on the PMK. This is the processing equivalent to the 4-Way handshake performed in the WPA (Wi-Fi protected access) or WPA2. In this way, the wireless connection between the printer 305 and the access point 302 is established.

When the connection processing by the procedure described above is completed, data communication between the printer 305 and the access point 302 becomes possible. Thereafter, when the printer 305 tries to re-connect to the access point 302, the printer 305 transmits the association request packet to which a PMKID based on the PMK generated as described above is added. Accordingly, the printer 305 and the access point 302 can perform re-connection processing based on the IEEE 802.11 standard without performing the processing in F403 and F404. That is, when the printer 305 tries to re-connect to the access point 302 after the encryption key for communication was set, the procedures (F403 to F404) for sharing the communication parameters and setting the encryption key (PMK) are omitted, and the setting of the encryption key to be used in the wireless communication (F405 to F412) is started.

The access point 302, upon receiving an association request packet to which a PMKID is added (F407), internally searches whether PMKSA information or PMK information that is associated with the added PMKID exists. The access point 302 can determine that, if information associated with the PMKID information exists, the association request packet (F407) is a re-connection request, and if not, the association request packet is a first connection request after the parameters have been set by the DPP. Here, when re-connection is performed, the transmission and reception of the DPP connection request (F403) and the DPP connection response (F404) is not performed, and the confirmation procedures (1) to (3) described above are also not performed. That is, the processing corresponding to the network introduction exchange and the generation of the PMK in the DPP are omitted. As a result, the time until the connection is established at the time of re-connection can be reduced.

Note that if the PMKID information cannot be referred to, due to expiration or restarting of the access point 302, the connection processing is performed from the beginning without omitting the processing in F403 and F404. Here, when the processing in F403 and F404 is re-executed, the processing may be automatically performed without performing display in the display unit 105, considering user's convenience, or a fact that authentication processing is re-performed may be displayed in order to call for user's attention. Also, if the information regarding the processing of setting communication parameters by the DPP is also lost, the printer 305 or the access point 302, or both of them need to re-perform the DPP processing (F400, F401) by the smartphone 304. In this case as well, the processing may be automatically performed without performing display in the display unit 105, considering user's convenience, or a fact that authentication processing is re-performed may be displayed in order to call for user's attention.

Also, in the procedure described above, the PMKID information is added to the association request packet at the time of re-connection, but there is no limitation thereto. For example, the PMKID information may be added to a probe request signal for the printer 305 to search for an access point. Alternatively, the configuration can also be such that the access point 302 adds the PMKID to a beacon signal or a probe response signal.

Figure 5:
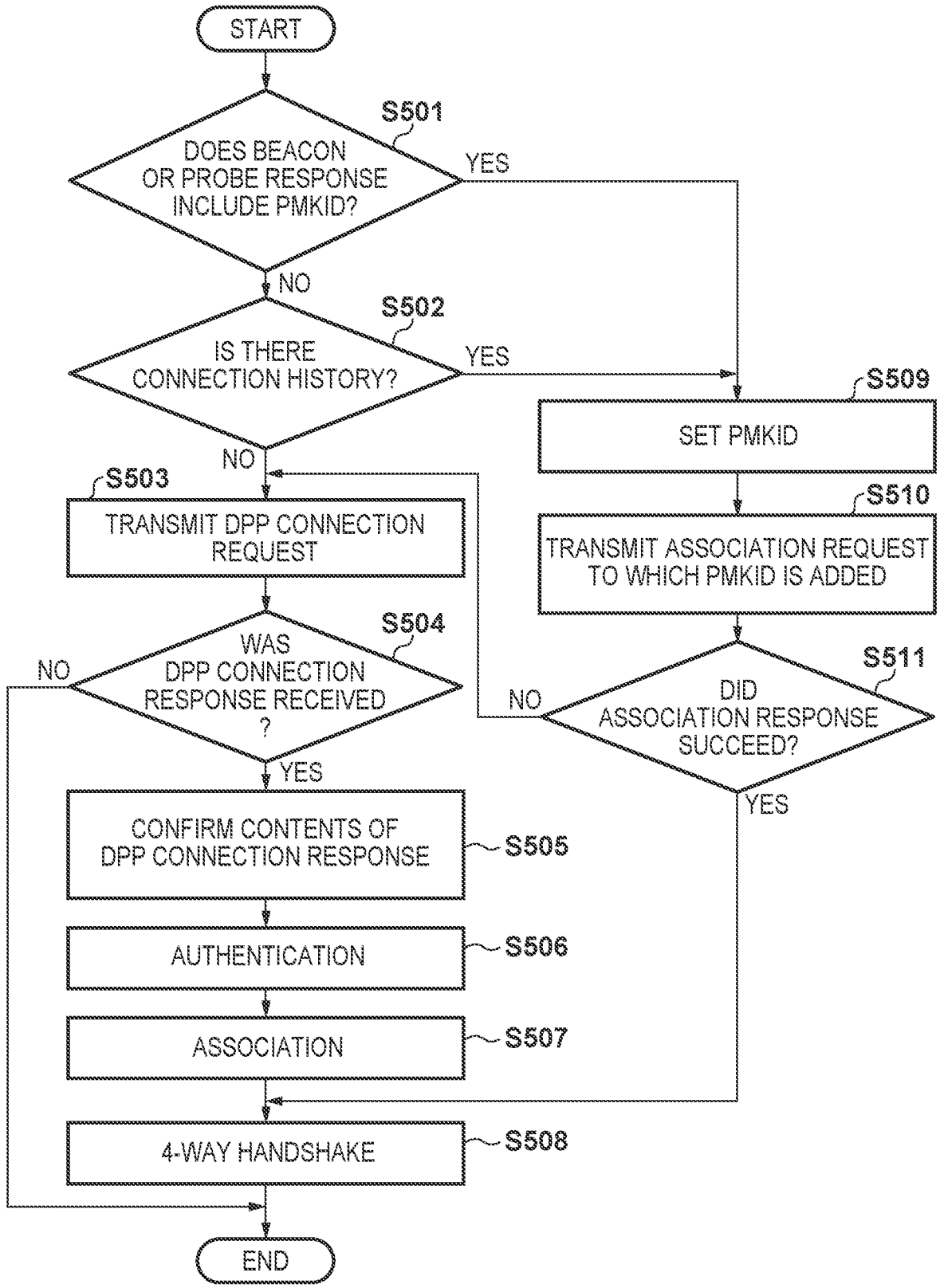
FIG. 5 is a flowchart illustrating operations of a communication apparatus (STA).
Figure 6:
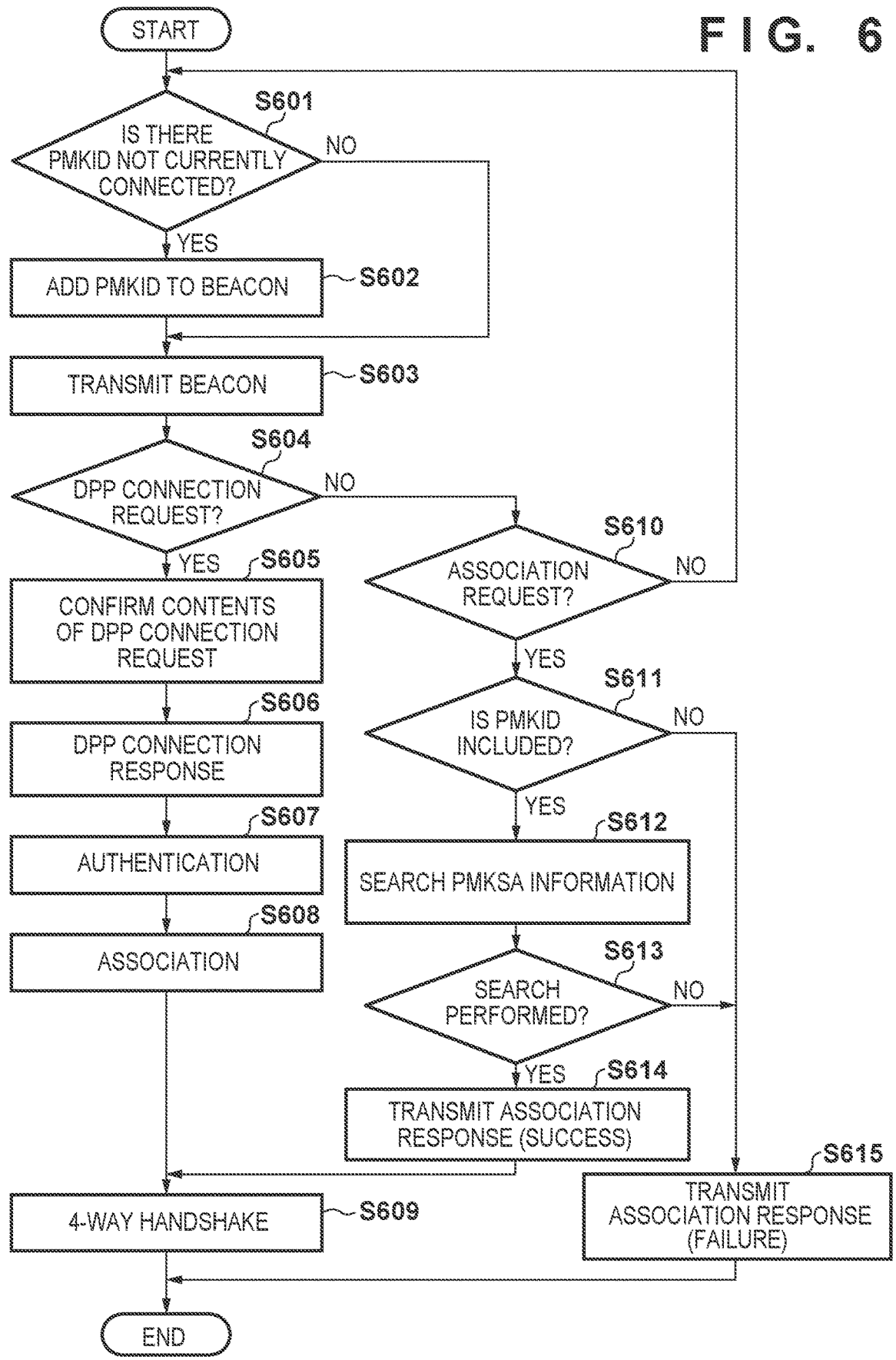
FIG. 6 is a flowchart illustrating operations of a communication apparatus (AP).

FIGS. 5 and 6 are flowcharts illustrating exemplary operations of the communication apparatus 101 (communication parameter control unit 202) according to the present embodiment. Note that the flowchart in FIG. 5 illustrates the operations of the printer 305. The printer 305 is in a state in which the processing of setting the communication parameters, by the DPP, with the smartphone 304 is completed. The operation flow when connection to the access point 302 is established in this state will be described. Also, the flowchart in FIG. 6 illustrates the operations of the access point 302. The access point 302 is also in a state in which the processing of setting the communication parameters, by the DPP, with the smartphone 304 is completed.

First, the printer 305 determines whether or not the connection to the access point 302 this time is re-connection to the access point 302 after the encryption key has been set by the 4-Way handshake described above. In the present embodiment, the determination is made in next steps S501 and S502, for example. First, the access point 302 that is the target of communication connection is searched by a partner apparatus search (step S501). In this example, the apparatus search is performed by detecting a beacon signal. The printer 305, upon detecting a beacon signal from an access point to be a target of communication connection, determines whether or not the beacon signal includes a PMKID corresponding to the PMKSA information retained by the printer 305. Note that the PMKID may be included in the probe response, as described above, and in this case, the printer 305 performs the aforementioned processing with respect to the PMKID included in the probe response. If NO is determined in step S501, the printer 305 determines whether or not a connection history with the access point 302 exists (step S502). Here, the determination regarding whether or not a connection history exists is determining whether or not at least any of MAC address information, BSSID information, and PMKSA information of the access point 302 is stored. Because the smartphone 304 does not transfer the device specific information such as a MAC address of the access point 302 to the printer 305 in the DPP processing, it can be determined that the connection history exists if the MAC address is retained.

For example, if neither PMKSA information nor a connection history exists, as in the case of first connection, the determination result in steps S501 and S502 is NO. Therefore, the printer 305 transmits the DPP connection request (F403) described in FIG. 4 to the access point 302 (step S503), and waits for a DPP connection response (F404) from the access point 302 (step S504). In step S504, if the DPP connection response has not been received, and an error end is determined, this processing is ended. Note that, in step S504, if the DPP connection response has not been received even if re-transmission of the DPP connection request is performed a predetermined number of times, the printer 305 determines the error end of the processing initiated by the DPP connection request. Alternatively, the configuration may be such that the DPP connection response is waited for a predetermined time regarding one time of DPP connection request, and if the DPP connection response has not been received even if the predetermined time has elapsed, an error end is determined.

The printer 305, upon receiving the DPP connection response (YES in step S504), confirms the contents of the DPP connection response received from the access point 302 (step S505). The contents to be confirmed here include the confirmation procedures (1) to (3) described in F403 to F404 in FIG. 4, for example. Note that a configuration may also be adopted in which the access point 302 confirms these confirmation contents, adds the result to a DPP connection response, and transmits the DPP connection response. In this case, the printer 305 omits the contents confirmation and adopts the result of confirmation made by the access point 302. At this time, the printer 305 sets a PMK.

Thereafter, the printer 305 performs transmission and reception of the authentication packet (F405 to F406) in accordance with the IEEE 802.11 standard (step S506). Then, the printer 305 performs transmission and reception of the association request (F407, F408) (step S507). If the printer 305 determines that the association response indicates success (normal response), the printer 305 performs 4-way handshake in order to generate an encryption key to be used for the communication through the wireless network (step S508). The encryption key generated here is a session key (PTK specified in the IEEE 802.11 standard), for example. When the 4-way handshake is completed, the printer 305 can perform data communication whose security is ensured, with the access point 302. On the other hand, if the association response indicates failure, this processing is ended. Alternatively, when the association response indicates failure, the processing from DPP connection in step S503 may be performed again.

On the other hand, if YES is determined in step S501 or S502, the printer 305 retains PMKSA information specified in the IEEE 802.11 standard as connection history information. In this case, the printer 305 sets PMKID information that is a hash value based on the retained PMKSA information (step S509). If the PMKID is retained, the PMKID may be read out and set. Also, the printer 305 adds the PMKID set in step S509 to an association request as additional information, and transmits the association request to the access point 302 (step S510).

The access point 302 that has received the association request to which the PMKID is added determines whether or not PMKSA information corresponding to the PMKID exists (described later using FIG. 6). If the PMKSA information corresponding to the PMKID exists, the access point 302 determines that the requested connection is re-connection, and returns "success" as the association response. If the PMKSA information corresponding to the PMKID added to the association request does not exist, the access point 302 determines that the requested connection is first time connection, and returns "failure" as the association response.

The printer 305 determines whether the association response to the association request transmitted in step S510 is success or failure (step S511). If success is determined in step S511, the printer 305 performs 4-way handshake in order to generate an actual session key (PTK according to the IEEE 802.11 standard) (step S508). In this way, the processing in steps S503 to S507 is omitted. On the other hand, if failure is determined in step S511, it means that the PMKSA information corresponding to the PMKID added to the association request does not exist in the access point 302, and the processing is returned to step S503. In this way, the printer 305 performs the connection processing again from the transmission of the DPP connection request. Here, the printer 305 may execute the processing in step S503 again without performing display in the display unit 105, considering user's convenience, or may also execute the processing in step S503 again while displaying the fact that authentication processing will be performed again in order to call for user's attention.

Note that an example is illustrated, in the flowchart in FIG. 5, in which if NO is determined in step S511, the processing is performed again from the DPP connection request (step S503), but there is no limitation thereto. For example, the processing may be performed from the parameter setting processing with the smartphone 304 (F401). Alternatively, the configuration may be such that when the DPP connection request in step S503 is performed, if the communication parameters that were obtained and set in F401 do not exist, the processing is performed again from F401. Moreover, in the embodiment, if the PMKSA information corresponding to the PMKID added in step S505 does not exist in the access point 302, the access point 302 returns an association response indicating failure, but there is no limitation thereto. For example, the configuration may be such that, if the PMKSA information corresponding to the PMKID added in step S505 does not exist, the access point 302 returns an association response indicating success, but will not start the 4-way handshake. In this case, the printer 305 waits for the 4-way handshake to start for a predetermined time. Then, if the 4-way handshake is not started before the predetermined time has elapsed, the printer 305 may once perform disconnection processing, and may perform processing again from step S503 in the flowchart shown in FIG. 5. Also, if the validated date of the PMKID included in a beacon or the like is expired, even if Yes is determined in step S501, the printer 305 may advance the processing to step S503 instead of step S509, and transmit a DPP connection request.

Next, the operations to be performed by the access point 302 will be described with reference to FIG. 6. If a PMKID exists that has been generated in communication with another communication apparatus that is not currently connected for communication (YES in step S601), the access point 302 adds the PMKID to a beacon (step S602), and transmits the beacon (step S603). If such a PMKID does not exist, in step S601, a beacon to which the PMKID is not added is transmitted (step S603). Then, the access point 302 waits for a DPP connection request signal or an association request from another communication apparatus (step S604, step S610). Note that a configuration may be adopted in which a normal beacon is transmitted, and in this case, the processing in steps S601 and S602 is omitted. Also, the configuration may be such that the PMKID is added to a probe response and the probe response is transmitted, instead of or in addition to the processing in steps S602 to S603.

The access point 302, upon accepting the DPP connection request (YES in step S604), confirms the contents of the DPP connection request (step S605). Here, the contents to be confirmed here includes confirmation procedures (1) to (3) described in F403 to F404 in FIG. 4, for example. Next, the access point 302 transmits a DPP connection response to the transmission source of the DPP connection request. The confirmation result in step S605 may be added to the DPP connection response. Thereafter, the access point 302 executes authentication (F405 to F406) and association (F407, F408) in accordance with the IEEE 802.11 standard (steps S607 to S608). Then, 4-way handshake is started with respect to the communication apparatus that has transmitted the association request (step S609).

On the other hand, if an association request is received while waiting for a DPP connection request and an association request, the processing is advanced from step S610 to step S611. The access point 302 confirms whether or not a PMKID is added to the received association request. If a PMKID is not added (NO in step S611), the access point 302 transmits an association response (failure) to the transmission source of the association request (step S615).

If the received association request includes a PMKID (YES in step S611), the access point 302 searches PMKSA information corresponding to the PMKID (step S612). If the corresponding PMKSA information has been retrieved (YES in step S613), the access point 302 transmits an association response (success) to the transmission source of the association request (step S614). Then, the access point 302 executes 4-way handshake with the apparatus that has transmitted the association request (step S609). As described above, if information for specifying an encryption key that has been set is added to an association request for instructing to start setting of the encryption key to be used in communication through the wireless network, the access point 302 starts setting of the encryption key to be used in communication. As a result, the sharing procedure in steps S605 and S606 is omitted, and the time needed in the connection processing can be reduced.

On the other hand, if the PMKSA information corresponding to the PMKID does not exist (NO in step S613), the access point 302 transmits an association response (failure) to the transmission source of the association request (step S615). In this case, 4-way handshake in step S609 is not executed. Note that if NO is determined in step S613, an association response (failure) is transmitted, but there is no limitation thereto. For example, the access point 302 may perform control such that, if NO is determined in step S613, an association response (success) is transmitted, but the 4-way handshake in step S609 is not started.

Also, if the validated date is set to the PMKID, the access point 302 manages the PMKID and the validated date in association therebetween in the PMKSA information, and confirms whether or not the validated date of the PMKID is expired in step S612. Then, if the validated date is not expired, Yes is determined in step S613, and if the validated date is expired, that is, the PMKID is invalid, No is determined in step S613. Note that, instead of this procedure, the access point 302 may also delete information regarding the PMKID with respect to which the validated date is expired, from the PMKSA information. According to such a configuration, similar effects can be obtained.

As described above, according to the embodiment described above, the procedure until the connection is established can be switched according to whether or not a connection history between an AP and an STA exists or not or the like, after the communication parameters have been set by the DPP, and the procedure to be performed at the time of re-connection can be simplified, in particular.

In the embodiment described above, a configuration has been described in which information for setting communication parameters is exchanged between apparatuses using an image of the QR code (registered trademark). However, wireless communication such as NFC or Bluetooth (registered trademark) may be used in place of shooting a QR code (registered trademark). Also, wireless communication such as IEEE 802.11 ad or TransferJet (registered trademark) may also be used.

Note that the QR code (registered trademark) to be read is not only a QR code (registered trademark) displayed in a display unit, but may also be a QR code (registered trademark) that is attached to a casing of a communication device in a form of a seal or the like. Also, the QR code (registered trademark) to be read may also be a QR code (registered trademark) that is attached to a manual or a package such as a corrugated board at the time of sales of a communication device. Also, instead of the QR code (registered trademark), a bar code or a two-dimensional code may also be used. Also, in place of information such as a QR code (registered trademark) that can be read by a machine, information in a form that can be read by a user may also be used.

Also, in the embodiments, a case where the communication between apparatuses is performed by wireless LAN communication conforming to IEEE 802.11 has been described, but there is no limitation thereto. For example, implementation may also be made using a wireless communication medium such as UWB (Ultra Wide Band), Bluetooth (registered trademark), ZigBee, or NFC. Here, UWB includes wireless USB, wireless 1394, WINET, and the like.

Also, in the embodiments, a case has been described where an access point of the wireless LAN provides wireless parameters, but there is no limitation thereto. For example, a group owner of Wi-Fi Direct (registered trademark) may provide wireless parameters.

According to the above described embodiments, the processing needed for re-connection between communication apparatuses is simplified, and the processing time needed for the re-connection can be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus, comprising:
at least one memory storing a program; and
one or more processors which, by executing the program, cause the communication apparatus to perform:
determining, based on predetermined information obtained from the first other communication apparatus before establishing connection with the first other communication apparatus, whether to execute re-connection with the first other communication apparatus;
obtaining, in a case where it is determined not to execute the re-connection, an encryption key by executing network introduction processing conforming to DPP (Device Provisioning Protocol) with the first other communication apparatus using a communication parameter obtained, from a second other communication apparatus that operates as a configurator in the DPP, in accordance with a Wi-Fi DPP standard;
executing connection processing with the first other communication apparatus using the encryption key; and
establishing, in a case where it is determined to execute the re-connection, connection with the first other communication apparatus while omitting obtaining the encryption key by the network introduction processing,
wherein, in the network introduction processing, the communication apparatus performs a communication of a Peer Discovery Request with the first other communication apparatus, and then receives, from the first other communication apparatus, a response signal in response to the communication of the Peer Discovery Request.

2. The communication apparatus according to claim 1, wherein the connection processing with the first other communication apparatus is started by transmitting an authentication packet or an association request to the first other communication apparatus.

3. The communication apparatus according to claim 1, wherein the connection processing executes 4-way handshake with the first other communication apparatus.

4. The communication apparatus according to claim 1, wherein
in the determining, it is determined whether a connection history exists regarding the first other communication apparatus based on the predetermined information, and in a case where it is determined that the connection history exists, it is determined to execute the re-connection with the first other communication apparatus.

5. The communication apparatus according to claim 1, wherein the predetermined information includes a MAC address of the first other communication apparatus, and it is determined to execute the re-connection with the first other communication apparatus in a case where the MAC address included in the predetermined information matches a MAC address connected by the connection processing in the past.

6. The communication apparatus according to claim 1, wherein the predetermined information is included in a beacon or a probe response that is received from the first other communication apparatus.

7. The communication apparatus according to claim 1, wherein, in a case where the predetermined information includes PMKID corresponding to PMKSA information being held by the communication apparatus, it is determined to execute the re-connection with the first other communication apparatus.

8. The communication apparatus according to claim 1, wherein in the re-connection, transmitted is an association request to which information indicating the encryption key is added.

9. The communication apparatus according to claim 1, wherein
in a case where the re-connection with the first other communication apparatus has failed, the network introduction processing with the first other communication apparatus is executed.

10. The communication apparatus according to claim 1, wherein the first other communication apparatus is an access point conforming to an IEEE 802.11 series standard.

11. The communication apparatus according to claim 1, wherein the encryption key is a PMK (Pairwise Master Key).

12. A communication apparatus, comprising:
one or more processors; and
one or more memories storing instructions that, when executed by the one or more processors, cause the communication apparatus to perform operations comprising:
determining whether a previously created encryption key is stored in a storage of the communication apparatus, the previously created encryption key generated in communication with another communication apparatus that is not currently connected to the communication apparatus for communication;
transmitting a signal used in an apparatus search, the signal including first information identifying the previously created encryption key;
obtaining, in response to a Device Provisioning Protocol (DPP) connection request, an encryption key by executing network introduction processing conforming to DPP with another communication apparatus which transmits the DPP connection request;
establishing connection with the other communication apparatus using the obtained encryption key; and
in a case where a request signal containing second information related to the previously created encryption key has been received from the other communication apparatus, establishing connection with the other communication apparatus that transmitted the request signal without performing the network introduction processing.

13. The communication apparatus according to claim 12, wherein connection with the other communication apparatus is established by executing 4-way handshake with the other communication apparatus.

14. The communication apparatus according to claim 12, wherein the signal used in the apparatus search is a beacon signal.

15. The communication apparatus according to claim 12, wherein the signal used in the apparatus search is a probe response that is transmitted in response to that a probe request corresponding to a beacon signal has been received.

16. The communication apparatus according to claim 12, wherein the communication apparatus is an access point conforming to an IEEE 802.11 series standard.

17. The communication apparatus according to claim 12, wherein the first information and the second information are PMKIDs.

18. The communication apparatus according to claim 17, wherein the first information and the second information are the same information.

19. A control method of a communication apparatus, comprising:
determining, based on predetermined information obtained from the first other communication apparatus before establishing connection with a first other communication apparatus, whether to execute re-connection with the first other communication apparatus;
obtaining, in a case where it is determined not to execute the re-connection, an encryption key by executing network introduction processing conforming to DPP (Device Provisioning Protocol) with the first other communication apparatus using a communication parameter obtained, from a second other communication apparatus that operates as a configurator in the DPP, in accordance with a Wi-Fi DPP standard;
executing connection processing with the first other communication apparatus using the encryption key; and
establishing, in a case where it is determined to execute the re-connection, connection with the first other communication apparatus while omitting obtaining the encryption key by the network introduction processing,
wherein, in the network introduction processing, the communication apparatus performs a communication of a Peer Discovery Request with the first other communication apparatus, and then receives, from the other communication apparatus, a response signal in response to the communication of the Peer Discovery Request.

20. A control method of a communication apparatus, comprising:
determining whether a previously created encryption key is stored in a storage of the communication apparatus, the previously created encryption key generated in communication with another communication apparatus that is not currently connected to the communication apparatus for communication;
transmitting a signal used in an apparatus search, the signal including first information identifying the previously created encryption key;
obtaining, in response to a Device Provisioning Protocol (DPP) connection request, an encryption key by executing network introduction processing conforming to DPP with another communication apparatus which transmits the DPP connection request;
establishing connection with the other communication apparatus using the obtained encryption key; and in a case where a request signal containing second information related to the previously created encryption key has been received from the other communication apparatus, establishing connection with the other communication apparatus that transmitted the request signal without performing the network introduction processing.

21. A non-transitory computer-readable storage medium storing a program for causing a computer to execute a control method of a communication apparatus, the control method comprising:
determining, based on predetermined information obtained from the first other communication apparatus before establishing connection with a first other communication apparatus, whether to execute re-connection with the first other communication apparatus;
obtaining, in a case where it is determined not to execute the re-connection, an encryption key by executing network introduction processing conforming to DPP (Device Provisioning Protocol) with the first other communication apparatus using a communication parameter obtained, from a second other communication apparatus that operates as a configurator in the DPP, in accordance with a Wi-Fi DPP standard;
executing connection processing with the first other communication apparatus using the encryption key; and
establishing, in a case where it is determined to execute the re-connection, connection with the first other communication apparatus while omitting obtaining the encryption key by the network introduction processing,
wherein, in the network introduction processing, the communication apparatus performs a communication of a Peer Discovery Request with the first other communication apparatus, and then receives, from the first other communication apparatus, a response signal in response to the communication of the Peer Discovery Request.

22. A non-transitory computer-readable storage medium storing a program for causing a computer to execute a control method of a communication apparatus, the control method comprising:
determining whether a previously created encryption key is stored in a storage of the communication apparatus, the previously created encryption key generated in communication with another communication apparatus that is not currently connected to the communication apparatus for communication;
transmitting a signal used in an apparatus search, the signal including first information identifying the previously created encryption key;
obtaining, in response to a Device Provisioning Protocol (DPP) connection request, an encryption key by executing network introduction processing conforming to DPP with another communication apparatus which transmits the DPP connection request;
establishing connection with the other communication apparatus using the obtained encryption key; and
in a case where a request signal containing second information related to the previously created encryption key has been received from the other communication apparatus, establishing connection with the other communication apparatus that transmitted the request signal without performing the network introduction processing.

\* \* \* \* \*